United States Patent [19]

Colgate et al.

[11] Patent Number: 5,188,402
[45] Date of Patent: Feb. 23, 1993

[54] GASKET APPARATUS AND HERMETICALLY SEALED JOINTS EMPLOYING SAID GASKET APPARATUS

[75] Inventors: Samuel O. Colgate; Grant M. Schrag, both of Gainesville, Fla.

[73] Assignee: University of Florida, Gainesville, Fla.

[21] Appl. No.: 304,178

[22] Filed: Jan. 31, 1989

[51] Int. Cl.⁵ .............................................. F16L 35/00
[52] U.S. Cl. .................................. 285/332; 285/333; 285/332.2; 285/332.4; 285/910; 277/207 R; 277/212 FB; 220/304
[58] Field of Search ............... 285/332, 333, 332.2, 285/332.4, 382.7, 910, 917; 277/212 FB, 207 R; 220/304

[56] References Cited

U.S. PATENT DOCUMENTS

| | | | |
|---|---|---|---|
| 974,975 | 11/1910 | Kelly | 285/910 X |
| 1,133,320 | 3/1915 | Rockwood | 285/910 X |
| 1,141,151 | 6/1915 | Speller | 285/333 X |
| 1,461,385 | 7/1923 | Falor | 285/332 X |
| 1,776,615 | 9/1930 | Boothman | 285/332.4 X |
| 1,839,340 | 1/1932 | Pittlick | 285/917 X |
| 2,052,713 | 9/1936 | Juffa | 285/332 X |
| 2,437,843 | 3/1948 | Van Ness | 285/333 X |
| 2,980,451 | 4/1961 | Taylor | 285/333 X |
| 4,241,845 | 12/1980 | Daly | 220/304 X |
| 4,589,187 | 5/1986 | Stone | 285/333 X |

FOREIGN PATENT DOCUMENTS

| | | | |
|---|---|---|---|
| 1138490 | 12/1982 | Canada | 285/333 |
| 0341249 | 12/1936 | Italy | 285/333 |
| 0002433 | of 1870 | United Kingdom | 285/333 |

Primary Examiner—Randolph A. Reese
Assistant Examiner—Heather Chun
Attorney, Agent, or Firm—Kerkam, Stowell, Kondracki & Clarke

[57] ABSTRACT

Gasket apparatus and hermetically sealed joints employing the apparatus are provided wherein a tapered male member and a tapered female member are joined and a substantially hermetic seal is created around a predetermined circumferential zone between the male member and the female member by a gasket disposed to have a protrusion thereon at the predetermined zone to engage one of the male or female members to concentrate the sealing forces for making up the joint at that zone.

41 Claims, 5 Drawing Sheets

GASKET APPARATUS AND HERMETICALLY SEALED JOINTS EMPLOYING SAID GASKET APPARATUS

BACKGROUND OF THE INVENTION

1. Field of the Invention

This invention relates to gaskets, and more particularly to gaskets for use in joints for ultra-high vacuum devices or devices requiring hermetic seals.

2. Description of the Prior Art

Ultra-high vacuum environments, and devices capable of maintaining an ultra-high vacuum are essential in a number of scientific and commercial settings including surface science studies, space simulation chambers and high energy physics research.

Similarly, hermetic seals are required in joints between members which separate very high and low pressure environments. For work at pressures less than $10^{-8}$ torr, it is necessary to bake the entire chamber of an ultra-high vacuum device and all its flanges to several hundred degrees Celsius in order to outgas all of the internal surfaces. Vacuum systems of this type thus require near perfect seals which are able to withstand the temperatures and pressure demands of the system and are also able to maintain their seals over a wide range of temperatures and pressures at all aperture points and openings to the ambient environment outside the vacuum system.

Temperature and pressure demands of systems under positive pressure, such as high pressure pipes, also require tight seals. Other services requiring near-perfect seals include pressurized chambers and cryogenic systems.

Especially important are the seals that must be provided for inlets through the chamber wall of an ultra-high vacuum or high pressure system and which allow for the performance of specialized functions within the vacuum chamber. For instance, in order to provide inlets for electricity, refrigerants, motion, gas or light into a vacuum or pressure system, hermetically sealed feedthroughs are required. Presently, these feedthroughs are generally welded or brazed to a flange or to the chamber wall of a vacuum chamber. Other flanges are sold with set configurations of permanently mounted electrical feedthroughs. If it is desired that a feedthrough be demountable, it is usually permanently mounted to a demountable flange. The flange is then sealed to a mating flange on the vacuum chamber using a captured elastomeric O-ring or soft metal ring gasket.

An alternative method of incorporating a feedthrough into a vacuum or pressure system is by the use of feedthroughs mounted on threaded fittings. The male fitting is sealed to the female thread which has been formed in a flange or through the chamber wall using Teflon tape as a gasket material to effect a better seal. The gasket materials used in vacuum systems are chosen on the basis of their outgassing rates, chemical inertness, thermal stability, and their ability to flow to fill microscopic defects on the two sealing surfaces. Concurrently, threaded fittings are not commonly used for ultra-high vacuum systems, as the integrity of the Teflon seal is destroyed at temperatures above 200 degrees Celsius. Bakeable ultra-high vacuum systems usually employ all metal (copper) gasket seals which will withstand baking up to about 450 degrees Celsius.

Pipe thread gaskets of metal have been proposed in the past for use in pipes carrying fluids under pressure. These gaskets are threaded and intended for inclusion in pipes having male and female ends that are of tapered tubular structure. However, the known types of pipe thread gaskets operate on a principle whereby a complete sealing of each thread in a pipe threaded joint is required, a capability that in practice is difficult to achieve. Further, such gaskets require large amounts of torque to be applied as the members are being threaded together. Heretofore lacking in the prior art is a metal gasket that will permit the use of commercially available feedthroughs on threaded fittings in ultra-high vacuum or in pressurized systems, particularly in systems which experience high temperature cycling, such as the cycling experienced in or baking and degassing processes, or in cryogenic service.

SUMMARY OF THE INVENTION

Accordingly, it is one object of the present invention to provide for a gasket seal for use in ultra-high vacuum systems which can effectively seal to pressures less than $10^{-8}$ torr.

Another important object of the present invention is to provide a gasket which is capable of providing a seal between male and female members which concentrates sealing forces at a predetermined narrow band around a circumference between the male and female members, permitting the joint to be formed using less torque or insertion force.

It is another object of the present invention to provide a means for easily mounting and demounting fixtures within an ultra-high vacuum or a pressure chamber which can be quickly and easily changed depending on the requirement of a particular application.

Still another object and a unique feature of the present invention is the use of a separate gasket member in combination with threaded fittings for use in feedthroughs of an ultra-high vacuum or a high pressure system whereby a seal is effected capable of maintaining a pressure of less than $10^{-8}$ torr for extended periods of time.

Another important object of the present invention is to provide high integrity seals made without the need for special surface preparations such as extreme flatness or high polish. A sealing element in at least one embodiment can be chosen to have a threaded surface.

Another object of the present invention is to provide a tapered cylindrical element which is forcibly inserted into a hole having a matching taper using a gasket therebetween having a circumferential protrusion, so as to join the members together by compression forces along at least one circumferential band thus sealing even microscopic potential leak paths.

Another object of the present invention is to provide the ability to form a seal for a feedthrough without necessitating machining, welding, brazing or other non-reversible processes for joining the feedthrough to a wall of a chamber.

Still another object and a significant advantage of the present invention is providing a mountable and demountable feedthrough seal for use in an ultra-high vacuum device which utilizes a soft, malleable metal, such as copper, to tightly and completely seal the feedthrough along at least one circumferential zone or band by exuding the soft metal into possible leak paths so that all leak paths are eliminated.

In accordance with these and other objects, advantages and features of the invention, there is provided in one embodiment of the present invention, a gasket for use in a tapered joint, the joint comprising a tapered male member, a tapered female member, and the gasket, the gasket having a longitudinal extent and having a first and a second aperture end, the first aperture end being larger in cross-section than the second aperture end, the gasket having an inner surface adapted to engage the male member and an outer surface adapted to engage the female member, the gasket further having means for concentrating sealing forces of the joint at a predetermined circumferential zone along the longitudinal extent to produce a substantially leak proof seal at the predetermined zone.

A further embodiment of the present invention provides a joint for use in providing a substantially hermetic seal comprising:

a. a tapered, frusto-conical male member;

b. an apertured female member having a sidewall of substantially frusto-conical shape adapted to frictionally engage the male member; and c. means for sealing the joint substantially hermetically, the sealing means comprising an annular channel disposed around a circumference of the male member and a gasket comprising an elastomeric ring disposed in the channel, the ring and the channel being so constructed and arranged that the ring protrudes radially outwardly from the male member frusto-conical surface when the ring is in an uncompressed state.

In another embodiment of the present invention, a threaded metal gasket for use in a threaded joint is provided which comprises a substantially cylindrical tube having a first and a second aperture end, and having threads on an inner and on an outer surface, the outer surface being engagable with a threaded female member, the inner surface being engagable with a threaded male member to form the threaded joint, the gasket having means for concentrating sealing forces in the threaded joint at a predetermined narrow zone of the gasket to produce a substantially leak proof seal at the narrow zone in the joint.

In a further embodiment, the present invention provides a joint for use in providing a substantially hermetic seal comprising:

a. a tapered, frusto-conical male member;

b. an apertured female member having a sidewall of substantially frusto-conical shape adapted to frictionally engage the male member; and c. means for sealing the joint comprising a gasket intercalated between the frusto-conical male member and the female member, the gasket having at least one circumferential zone wherein a portion of said gasket protrudes radially outwardly for engaging said sidewall of said female member with respect to the remainder of the gasket and the male member along a longitudinal axis thereof, whereby an hermetic seal is effected around a predetermined circumferential band between the male and female members when in an engaged position.

These and other objects, features and advantages will become apparent in light of the following detailed description of the invention when understood with particular reference to the drawings, wherein like reference numerals indicate like elements of the invention shown in different embodiments.

DETAILED DESCRIPTION OF THE INVENTION

Figure 1:
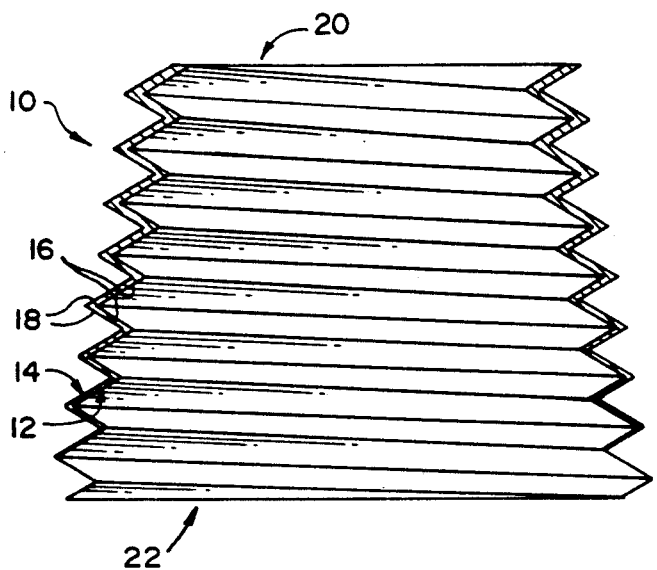
FIG. 1 illustrates an embodiment of the inventive frusto-conical gasket in cross-section.

FIG. 1 illustrates one embodiment of the inventive frusto-conical gasket 10, in cross-section, and particularly shows the increasing wall thickness along a longitudinal or axial direction of the gasket. Gasket 10 has an inner surface 12 and an outer surface 14, both of which are threaded. Both the inner and outer surface of the gasket are threaded with the same number of threads per inch as a National Pipe Thread (NPT) standard fitting, and the internal threads 16 and external threads 18 are in good registration.

In a preferred embodiment, the external thread 18 is tapered to match the standard NPT taper of one degree forty seven minutes (1.78°). The internal thread 16 is more steeply tapered, preferably at approximately six degrees. The tapers, threads per inch and other dimensions of the male and female fittings not specifically directed to the inventive gasket are standard fittings conventional to the art of one of the intended applications of the gasket, that of ultra-high vacuum systems, which commonly employ NPT standards for threaded fittings.

As is illustrated in FIG. 1, the gasket has the shape of a truncated cone or frusto-conical shape, which has a narrow aperture end 20 and a wide aperture end 22. Moreover, the inventive aspect of the FIG. 1 embodiment of gasket 10 is shown by the gasket wall thickness as defined by the inner surface 12 and outer surface 14. The gasket wall thickness increases from the wide end 22 toward the narrow end 20 as a result of the difference in the angles of the tapers discussed above.

Figure 2A:
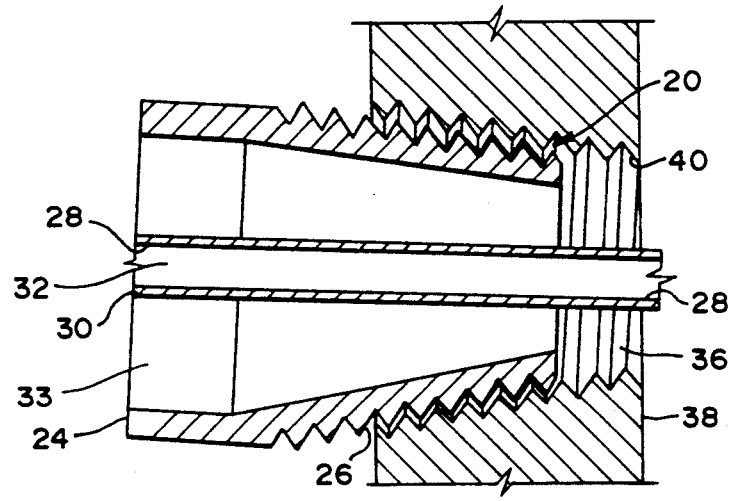
FIG. 2a illustrates in cross-section the gasket of FIG. 1 in use as a male member is being threaded into a female member.
Figure 2B:
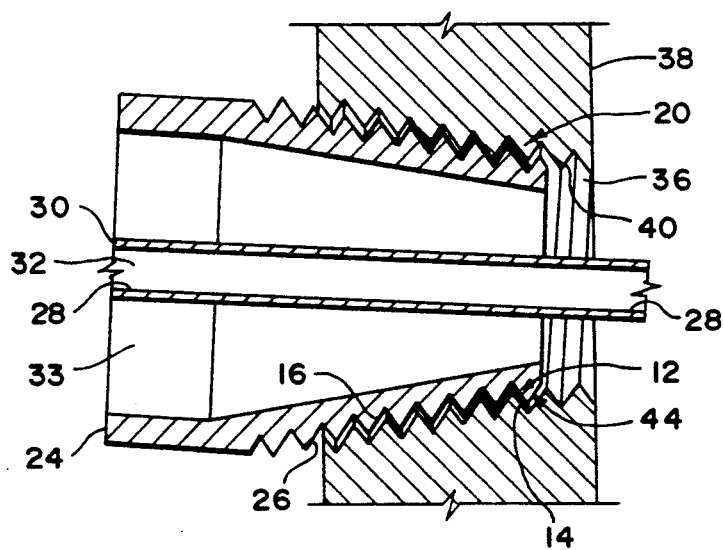
FIG. 2b illustrates in cross-section the identical elements of FIG. 2a with the male member being threaded into the female member in a position where the inventive gasket begins making contact with the threaded wall of the female member.

As is more clearly illustrated in FIGS. 2a-b, the gasket wall thickness has its larger dimension at the narrow end 20. Gasket 10, shown in solid black color for clarity, is threaded onto a male member 24, and the internal threads 16 match the threads 26 of the male member 24.

Complete threading of gasket 10 onto male member 24 results in a snugly fitting male member-gasket assembly.

Male member 24 can be a standard fitting used in conventional ultra-high vacuum systems and is generally made of a high strength metal, such as stainless steel. Male member 24 has a frusto-conical surface 44 matching the inner surface 12 of gasket 10 so that as gasket 10 is completely threaded over the male member, threads 26 of male member 24 complement internal threads 16 of the gasket 10 and there is substantially no passage or leak path between gasket 10 and the male member surface 44. Male member 24 further advantageously comprises a feedthrough 28 such as refrigerant pipe 30 having passageway 32. Space 33 between male member wall 34 and feedthrough 28 may be either solid metal, as male member wall 34 can be an integral piece providing a bore for the feedthrough, or the space may contain a good sealant which is bakeable up to temperatures exceeding several hundred degrees Celsius, such as glass or ceramic. The use of optional space 33 allows for different sized feedthroughs to be inserted without requiring customization of male member 24 for each application.

Feedthroughs other than refrigerant pipe 30 may be provided, depending on the desired function to be performed. These include feedthroughs such as electrical, light, waveguide or motion inlets.

Male member 24 is intended to be threaded into female member aperture 36 in female member wall 38 so as to form an hermetic seal between the male and female members by using the gasket 10 as a sealant between male member threads 26 and female member internal threads 40 formed in wall 38, wall 38 also being made of a high strength metal, such as stainless steel.

FIG. 2b more clearly illustrates the advantage deriving from the increase in gasket wall thickness at the narrow end 20. FIG. 2b is almost identical to FIG. 2a with the exception that FIG. 2b shows male member 24 threaded one more thread beyond that shown in FIG. 2a. In this position, it is evident that as male member 24 is threaded into female member aperture 36, contact between the male member-gasket assembly and the female member threads 40 is first made by the external threads 14 of the gasket narrow end 20. Continued torque forces exerted on the assembly will create increasingly greater pressure on the gasket between female member internal threads 40 and male member threads 26, as the female member threads 40 and male member threads 26 come more closely into registration.

The advantage in the seal created by gasket 10 is derived as substantially or nearly all of the pressure resulting from the continued application of torque is concentrated at a single section of the gasket 10, i.e. at the thread or narrow band of threads immediately adjacent the narrow end 20 of gasket 10. Thus, compared to a conventional gasket having a uniform wall thickness, relatively less force in the form of torque applied to the male member is necessary to obtain the result of an hermetic seal. Also, the gasket wall thickness may advantageously be designed such that the gasket is thin enough at the beginning of the threading process to allow standard male and female fittings to be used, while at the same time being thick enough when the threading process is completed to prevent gasket 10 from tearing apart when gasket 10 is completely swaged between threads 26, 40 on surfaces 42 and 44, respectively. Gasket tears are relatively common in situations where thin gaskets of uniform wall thickness are employed and the wall thickness of the gasket is reduced in the swaging of the gasket between the male and female members.

In order to be capable of creating an hermetic seal, gasket 10 should comprise a material which will seep, ooze or flow plastically into all available space between the male member threads 26 and female member threads 40. Moreover, in order to completely outgas the chamber of an ultra-high vacuum system, represented here by the space to the right of female member wall 38, the system including the gasket must be capable of withstanding temperatures of several hundred degrees Celsius. Accordingly, gasket 10 is advantageously manufactured from a soft, malleable metal, such as copper.

Figure 3:
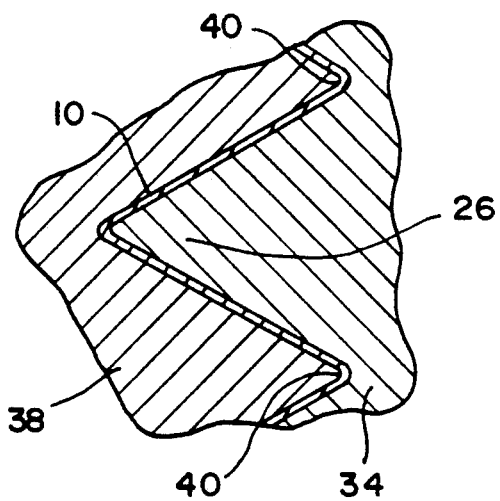
FIG. 3 illustrates in cross-section detail the gasket being squeezed by the screw threading of the male and female members and sealing a space therebetween.

FIG. 3 shows a cross-sectional detail of gasket 10 in the fully swaged position as it would appear when completely sealed. Male member 34, having threads 26, directly abuts the throughs between threads 40 of female member wall 38. More importantly, the pressure exerted in threading the male member-gasket assembly completely into the female member aperture 36 has eliminated any air gaps or leak paths at the thread or band of threads near the narrow end of gasket 10 as the gasket material has flowed or extruded into even microscopic gaps between male and female members which may be present. Thus a completely hermetic seal is formed between male member wall 34 and female member wall 38.

The seal thus formed is moreover easily broken by reversing the torque pressure on the metal male member 24 and removing the male member-gasket assembly. Thus the assembly can be mounted and demounted for changing out feedthroughs, for example, in accordance with the requirement of the particular function of feedthrough 28 desired in the chamber. Because only a narrow band of the fitting will be tightly wedged together, the removal process requires less force and provides less risk of damage than was hitherto known.

In testing the sealing properties of the FIG. 1 embodiment of the gasket in an arbitrarily chosen, conventional $\frac{1}{8}$-27 NPT system for use with conventional NPT fittings, gaskets were made of annealed OFHC copper, although any suitable malleable material may be used. Each gasket consisted of a band of copper which was tapered and threaded in accordance with the gasket 10 of FIG. 1. The gaskets were then each threaded onto a metal male member.

In order to check the integrity of the seals, the gaskets were lubricated with molybdenum disulfide ($MoS_2$), which is compatible for use as a lubricant in an ultra-high vacuum device, before being threaded onto the male member. The assembly was then threaded into a female member and tightened with a torque wrench. The system was then tested using a Helium mass spectrometer leak detector and found to be leak free.

Manufacture of the threaded gasket 10 may proceed in one of several ways. For instance, one method which may be used is machining a copper tube blank to the specification of the above described preferred embodiment. The actual prototypical gaskets described above were formed by forcing soft copper tubing over a form machined on a stainless steel rod having the desired internal taper of six degrees. The internal threads were then produced using a cold forming tap fabricated from drill rod. The partially formed gasket was then threaded onto a piece machined from stainless steel having the same pitch as the NPT standard but with the internal six degree taper. The external threads of this piece were registered with the threading tool in a lathe and the external threads were cut on the gasket at the standard one degree forty seven minutes (1.78°) taper. The gaskets were then annealed in a methane-air flame, washed and etched with a nitric acid pickling solution to produce the desired threaded gaskets.

Another method which may be used in manufacturing the gaskets employs a stamp die process. The gaskets may be partially formed using a rubber stamp die. Using this approach copper tubing may be forced over a stainless steel form having the desired internal taper. The form and tubing are then placed on a lathe, and the external taper is cut to match the desired dimensions. This copper blank then is annealed, washed and pickled. The blank is then placed in a rubber stamp die using a brass piece having the desired internal taper (six degrees) and the standard NPT pitch threads as a central arbor. External pressure may then be applied until the copper blank flows, following the form of the brass arbor and thereby forming the internal and external threads, simultaneously. The gaskets are then preferably reannealed, washed and pickled.

A further method which may be employed for the manufacture of the gaskets 10 is by cold forming the gasket in a hardened steel die. A die could easily be manufactured having the desired internal and external threads, and the gasket would be cold worked into its final desired configuration.

Figure 4:
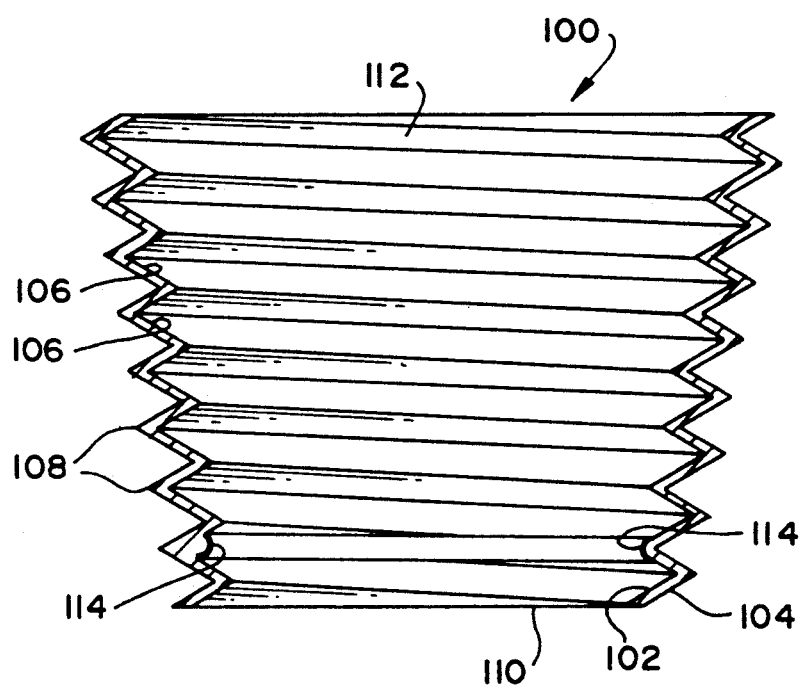
FIG. 4 illustrates a cross-section of an alternate embodiment of a tapered threaded gasket of the present invention.

FIG. 4 depicts, in cross-section, an additional preferred embodiment of the threaded metal gasket 100 of the present invention. In this embodiment, gasket 100 has an inner surface 102 and an outer surface 104 which define a wall thickness of the gasket. The gasket depicted in FIG. 4 has a set of internal threads 106 and a set of external threads 108, and the gasket 100 is further tapered and thus has a narrow end opening 110 and a wide end opening 112.

As with the threaded gasket of the FIG. 1 embodiment, the internal threads 106 are adapted to engage a male member (see FIG. 2), and the external threads 108 are adapted to engage the threads of a female member opening. In contrast to the FIG. 1 gasket, the internal and external threads 106, 108, are preferably tapered at the same angle, for example the 1.78° NPT taper, and thus a wall thickness of the gasket 100 is substantially uniform over a majority of the longitudinal or axial extent.

The gasket 100 in this embodiment is provided with, as a means for concentrating the draw up or sealing forces at a predetermined circumferential zone in the fitting, an integral annular protrusion 114 which extends inwardly from inner surface 102 of gasket 100. As depicted, the protrusion 114 forms an annular ring extending around the inner circumference of gasket 100 at a location adjacent to narrow end opening 110. The integral ring protrusion 114 creates an area of increased wall thickness which, when the threaded joint is assembled, is swaged down and flows into a narrow ring-like zone or area between the male and female members to hermetically seal the joint.

In practice, the extra thickness provided by the protrusion 114 need only be on the order of a few thousandths of an inch, and further may be on the order of only a few thousandths of inch in width, the width being measured in the longitudinal or axial direction. As this zone is substantially the only portion of the gasket where the inner surface 102 and outer surface of 104 are not of the same geometry as the male and female members, respectively, sealing forces will be concentrated at this zone. Further, the provision for only a small amount of excess material in the annular protrusion 114 has the result that the clamping or sealing torque required to complete the joint is relatively low. This is important where alternate embodiments of the male or female member, several of which may be quite fragile, are employed. For example, one of the male or female members to be sealed may be fabricated of a ceramic material, or alternatively, an optical glass window may be provided in the male member.

The gasket of FIG. 4 may advantageously be used in forming a joint by initially insetting a male member in the interior of the gasket to a point where protrusion 114 interferes with the male member. The male member and gasket assembly are subsequently threaded into a female member, and as the external threads 108 and taper of the gasket substantially conform to the threads of the female member, this assembly will be threaded nearly completely into the female member. At this point, continued torque will cause the threads of the male member to begin deforming the annular protrusion 114, thereby causing the thicker material to flow, create increased pressure between the male and female members and effect the hermetic seal at this region or zone. This embodiment of the gasket 100 has the advantage that the sealing zone may be very precisely located, and the zone may be chosen, as shown, adjacent the inner opening of the gasket to minimize the possibility of trapping gas in the joint.

The gasket 100 may advantageously be fabricated using a rubber plug bulging die, wherein a hollow cylindrical copper tube having an inwardly protruding annular ring around a section of the interior circumference is used as a blank. The blank is placed in a female split die having the desired thread pitch and taper. A rubber plug is inserted into the interior of the blank and then rammed to bulge the plug radially outwardly to the female split die to form the gasket. The annular ring will maintain an increased thickness in this method, while the remaining inner surface of the blank will take on a thread pitch which complements the exterior thread pitch created by the die. As wide end 112 would be expanded to a greater degree than narrow end 110, the wall thickness will be slightly less at the wide end, similar to the FIG. 1 embodiment. However, if nearly-perfect uniform wall thickness is desired, the wall thickness of the blank may be designed to yield a uniform wall thickness in the end product.

Figure 5:
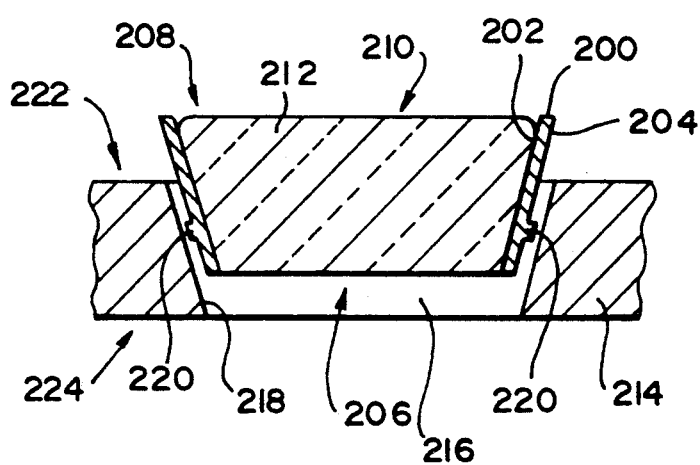
FIG. 5 illustrates a cross-section of a further embodiment of a tapered gasket according to the present invention.

In FIG. 5, a further embodiment of the metal gasket apparatus of the present invention is depicted. Gasket 200 in this embodiment is used to seal joints between male and female members which are not threaded, but rather are complementarily tapered. Gasket 200 has an inner tapered surface 202 and an outer tapered surface 204, the gasket terminating at a narrow end opening 206 and a wide end opening 208.

Generally, when a tapered cylindrical element is forcibly inserted into a hole having a matching taper, the resulting union either seizes by frictional forces or may be easily separated depending on the angle of taper, the size of the pieces, the surface conditions and the materials. In general, fine tapers (c.a. <5°) tend to seize and coraser ones to release. These principles are widely exploited in mechanics and tooling. Several standards exist for both locking and releasing tapers. Among the former, Morse tapers, Jacobs tapers, and Brown and Sharpe tapers are used to secure cutting tools and small chucks on machinery, while standard releasing tapers are used to locate collects and chucks on lathes, milling machines and the like.

The FIG. 5 embodiment of the present invention makes use of a self-locking taper to hold the joined elements together following assembly, particularly in those cases where the pressure differential across the joint is in the direction which forces the tapered members together.

Gasket 200 is shown in FIG. 5 in use with a male member 210 comprising a glass window 212, although the male member 210 may also be an unthreaded, tapered feedthrough similar to that depicted in FIG. 2, or any other desired male fitting. Female member wall has an opening 216 therethrough defined by tapered surface 218. Surface 218 preferably has a substantially identical angle of taper as male member 210 and gasket 200.

Unlike the embodiments of the gasket apparatus described above, the joint to be formed is not effected by a rotary, threading motion, but rather by insertion without axial rotation, and the gasket 200 may therefore alternatively be referred to as a ram-type seal. The gasket 200 and male member 210 are locked in place by friction acting over the tapered outer surface 204 of the gasket and the tapered surface 218 of the female member, as well as the friction acting between gasket inner surface 202 and male member 210.

The gasket 200 in the FIG. 5 embodiment possesses means for concentrating the sealing forces around a narrow circumferential band of the joint. An integral sealing ring 220 extending outwardly from the outer surface of gasket 200 provides a zone of increased wall thickness, the gasket wall thickness being relatively uniform along the remainder of the longitudinal extent of the gasket 200. The joint elements depicted in FIG. 5 are assembled by first engaging male member 210 with inner surface 202 of the gasket. This subassembly is then inserted into wall opening 216 in a manner shown in FIG. 5, gasket 200 thereby being intercalated between the male and female members. Further insertion of the gasket/male member subassembly causes sealing ring 220 to come into contact with tapered surface 218 of the female member. Still further insertion force results in the deformation and flowing of sealing ring 220 in response to the pressure applied, which has the effect of creating a full circumferential seal, thus closing off potential leak paths, between the male and female members of the joint. The provision for an increased material thickness in the form of sealing ring 220 at a predetermined zone around the circumerence of gasket 200 ensures that the additional gasket material will flow into and seal potential gaps at the zone due to minor surface irregularities, lack of perfect concentricity between male and female members, or the like.

While the ram-type seal using gasket 200 may generally produce an adequate seal due to the frictional engagement of the members, the integrity of seal may be further enhanced in both high vacuum systems and high pressure systems by designing the joint such that the wide end of gasket 200, male member 210, and female member opening 216 in wall 214 are facing the side of wall 214 experiencing the higher pressure. Stated another way, the pressure differential from higher pressure to lower pressure across the joint is in the same direction which forces the tapered members together. This would be the top side 222 of the gasket and joint depicted in FIG. 5. In a vacuum system, side 222 would be exposed to the atmosphere or a pressure higher than that of the vacuum at lower side 224. In a high pressure system, side 222 would be exposed to the pressurized system.

Gasket 200 may be made of malleable metals such as copper or gold. A particularly advantageous use of a fitting employing gasket 200 is in a system where windows or feedthroughs are desired for use in extreme environments of harsh chemicals or high and low temperature service. Additionally, the ram-type seal gasket may advantageously be employed where a particular type of seal, which would conventionally require a chemical bond between materials which are difficult to bond, is required. The use of gasket 200 avoids the need for chemical bonding of the fitting.

Figure 6A:
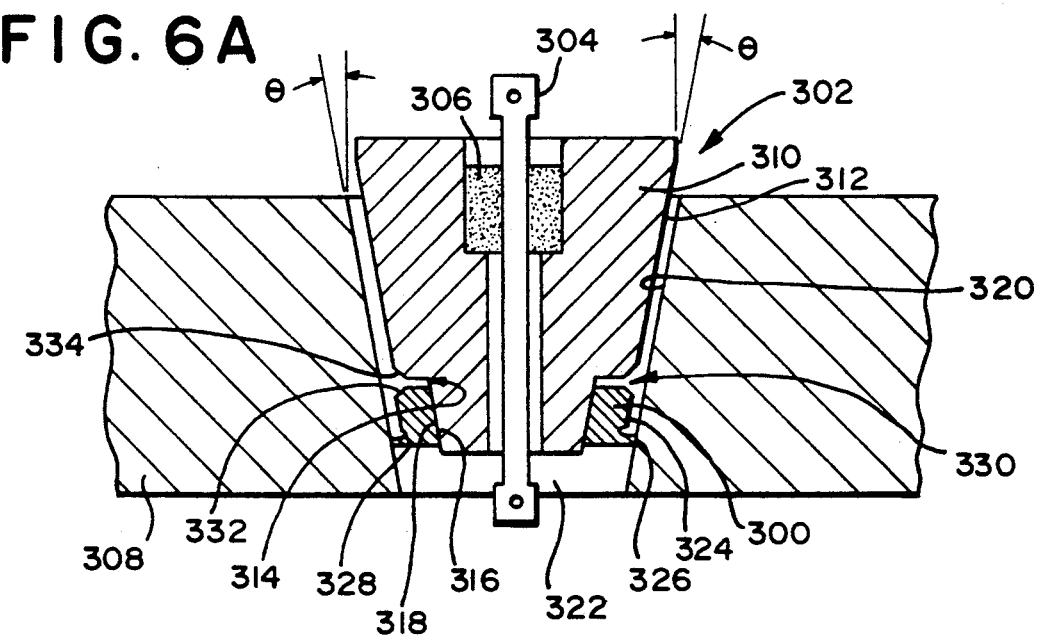
FIG. 6a illustrates a further embodiment of the inventive gasket in cross-section.
Figure 6B:
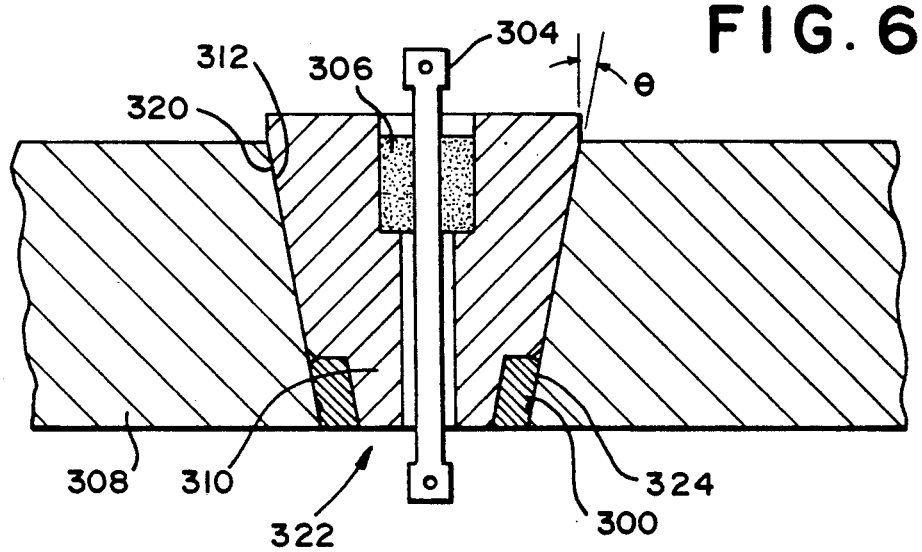
FIG. 6b illustrates in cross-section the identical elements of FIG. 6a in an engaged sealed position.

FIGS. 6a and 6b show another embodiment of a connection or joint employing a gasket 300 in a ram-type seal. In this embodiment a specially configured male member 302 is provided, depicted in these figures with a standard feedthrough member 28'.

The feedthrough depicted in this embodiment is an electrical feedthrough 304 insulated by insulating material 306. Feedthrough 304 extends through male member 302 and is accessible from either side of metal female member wall 308. Male member 302 further comprises a metal element 310 having a tapered frusto-conical male member surface 312. The angle of taper $\theta$ in practice is about 1°, but is exaggerated in FIGS. 6a,b to more clearly show the inventive aspect of the system.

Gasket means 300 is in the form of an annular ring or band, also termed a fillet, circumscribing the male member metal element 310 at its narrow end, and is made of a soft, malleable metal, such as copper. The tapered male member metal element 310 is provided with a step 314 at its narrower end to receive the gasket 300. Gasket 300 fits snugly over the narrower end of male member 310 and may have internal threads which allow it to be threaded onto the male member narrow end. No threads appear in the preferred embodiment shown in FIGS. 6a,b but any surface to which copper will bond under pressure may be used to connect gasket 300 to male member 310.

The tapered surface 316 extending from step 314 and the inside surface 318 of gasket 300 are sized to fit snugly together. They are shown in FIG. 6a to have the same angle of taper as male member surface 312 and female member surface 320, but this condition is not essential. In particular, step 314 and the inside surface of gasket 300 may have no taper at all, or each may be threaded. The only requirement is that an hermetic seal be formed by pressure on the gasket 300 in the inwardly radial direction, i.e., toward the feedthrough 28, once the joint is formed.

Female member surface 320 of female member aperture 322 also has a taper with an angle $\theta$ identical to the taper of the wall of male member surface 312. Both male member 310 and female member aperture 322 may be machined to exact specifications to ensure the snug fit between surfaces 312, 320.

The seal is achieved by disposing the gasket 300, being a ring of deformable material, onto the male member step 314 such that it will form a metal-to-metal bond with the male member metal element 310 when it is compressed by the assembly force described below. The assembly force is applied in an axial direction, and no relative rotary motion between the surfaces 312, 320 of the two members is necessary. The use of a fine taper provides a mechanical advantage approximately equal to the cotangent of the taper angle (about a ratio of 57:1 for 1° taper), which translates to large radial compressive forces generated by moderate axial assembly forces. Such designs can generate sufficient compressive forces at the seal area to produce cold welds in several materials. Such seals are of similar quality to those made by hot welding or brazing techniques. These design criteria may be used with the FIG. 5 embodiment of the ram-type seal also.

The large radial compressive forces act to bind the male member metal element 310 and the gasket 300 and also act to bind the outer surface 324 of gasket 300 to the surface 320 of the female member aperture 322. Outer surface 324 is tapered to match the taper of female member surface 320 and forms a complementary frusto-conical surface. Gasket 300 also provides for a raised annular projection 326 which protrudes radially beyond this complementary surface. During the seal assembly, this projection is the first area of contact between the male member-gasket subassembly and the female member surface 320.

Assembly of the seal is accomplished by initially joining male member 302 and gasket 300 and inserting the male member-gasket subassembly into the female member aperture 322 and exerting an assembly force in the direction of the decreasing aperture diameter. Further axial assembly force is then applied onto the wide end of the male member so as to drive the tapered male member 302 and gasket 300 into the female member aperture 322. Sealing forces are concentrated at the zone or band where the raised annular projection 326 contacts and is compressed by female member surface 320.

Continued axial assembly and retaining forces may be applied by other elements, described below, which further wedge the male member 302 into the aperture 322. As the male member 302 reaches the practical limit in the insertion process, raised annular projection 326 becomes compressed and is flattened by female member surface 320. The material in the raised projection 326 provides the interference fit and a concentration of sealing forces when the joint is drawn up during assembly. Undercut 328 provides a space to receive some of the material extruded or flowed from raised projection 326 during assembly, and an optional space 330 may be left between male member metal element 310 and gasket 300 for the extruded gasket material to flow into during assembly.

FIG. 6b shows the resultant joint in cross-section. Gasket material has been forcibly extruded into the annular space between step 314 and female member surface 320. Both undercut 328 and optional space 330 are shown as filled in by excess extruded gasket material. Gasket 300 may be provided with a chamfer 332 and male member 310 may be provided with chamfer 334 at the inception of step 314 as a further volume which can accommodate any further excess extruded material, or flash, which may be displaced during assembly.

The assembly is firmly locked by the frictional forces of the seizing material and will resist substantial axial loads tending to separate the elements. It can, however, be disassembled by application of sufficient force especially if applied by an impulse, such as impact hammering, where desired.

The gasket 300 may be made of any material having high malleability and preferably which is bakeable up to several hundred degrees Celsius. The material should be chosen to have sufficient malleability to flow into surface irregularites common to finishes produced by ordinary tooling. For example, a copper gasket in a stainless steel gland would be appropriate for most vacuum requirements, including for ultra-high vacuum devices.

Figure 7A:
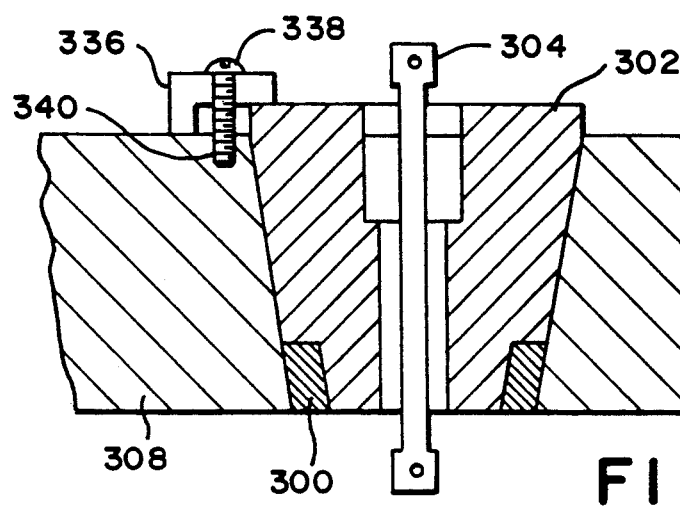
FIG. 7a-c illustrate the inventive gasket in a sealed position and show various embodiments of a means for retaining the device in the sealed position.
Figure 7C:
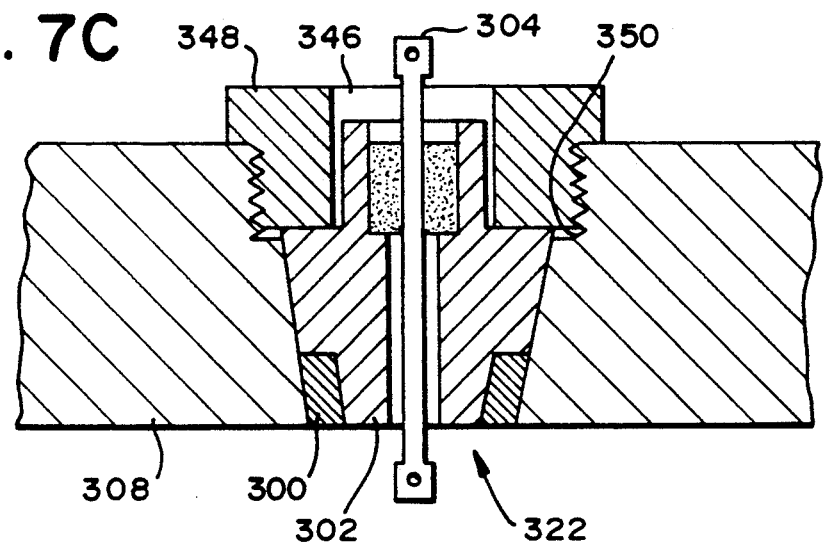
Figure 7B:
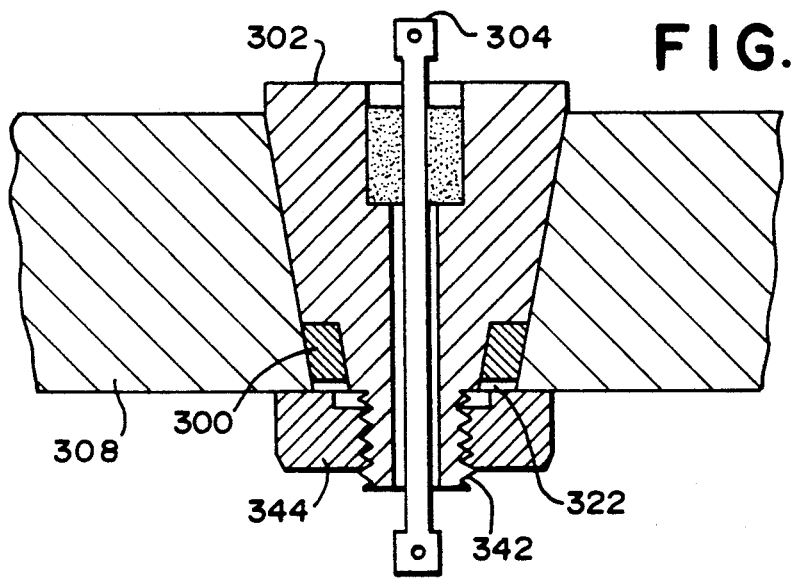

In situations where the axial loads under service conditions are likely to drive the sealed joint open, e.g. in high pressure chambers or conduits, auxiliary holding means may be employed. FIGS. 7a-c illustrate various embodiments of auxiliary holding or retaining means.

FIG. 7a shows a retaining member 336 which retains male member 302 in the female member aperture 322. Retaining member 336 in the depicted embodiment overlaps and abuts an end of male member 302 to prohibit axial movement tending to unseal the joint. Retaining member 336 may be held in place by retaining screw 338 which is screwed into screwthreaded hole 340 in female member wall 308.

FIG. 7b illustrates a second retaining means which may be a screwthreaded projection 342 which protrudes from the narrow end of male member 302 and which receives retaining nut 344. Retaining nut 344 abuts female member wall 308 thereby prohibiting male member 302 from backing out of aperture 322.

Alternatively, male member 302 may be held in place by applying force from the wide end of female member wall 308, an example of which is shown in FIG. 7c. An aperture 346 in retaining nut 348 provides access to feedthrough 304 and screwing nut 348 into the screw threaded aperture 350 brings nut 348 into abutment with male member 302 and may be further screwed in to exert axial pressure on male member 302 forcing it further into aperture 322.

Figure 8A:
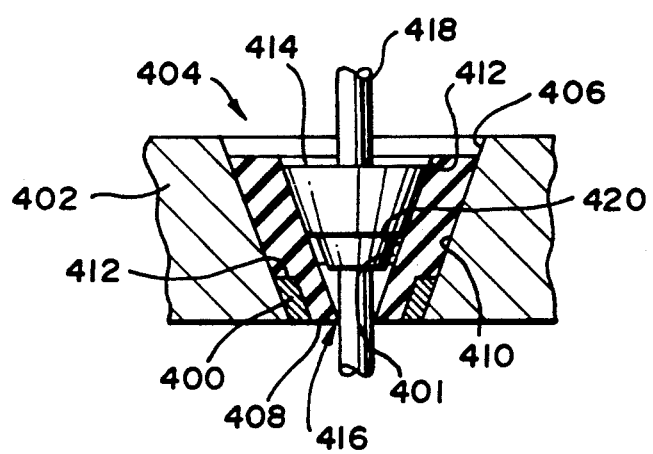
FIG. 8a,b illustrate another embodiment showing a sealed ceramic sleeve in a combination gasket seal in partial cross-section.

FIG. 8a,b illustrate a further embodiment of the present invention comprising a compound joint creating an insulated electrical feedthrough which avoids the requirement to make high temperature ceramic-to-metal seals. As shown in FIG. 8a, two gaskets 400, 401 are used in this embodiment of the tapered, ram-type gasket fitting. A female member wall 402 having aperture 404 defined by tapered surface 406 is provided in a manner similar to the previously described embodiments. Except where specifically noted, all tapered sufaces in the FIG. 8 embodiment share the same taper angle for effecting locking frictional fits.

A first male member 408 having both an outer surface taper 410 and an inner surface taper 412, may alternatively be referred to as sleeve 408. Sleeve 408 is preferably made of a high density ceramic, glass or crystalline material, and is provided with a step 412 designed to engage gasket 400 in a manner similar to that described with respect to FIGS. 6a,b. Gasket 400 may be made of a malleable metal as previously described.

The inner surface taper 412 of the sleeve opens to a wide aperture 414 and a narrow aperture 416. A tapered conductor post or pin 418 serves as a second, male member, also provided with a step 420 at a narrow end thereof, the post or pin 418 being sized to be received within sleeve 408. Gasket 401 is designed to engage conductor post 418 at the step 420 thereon. Each of gaskets 400, 401 may advantageously be configured in the same way as gasket 300, i.e. having a raised annular projection prior to joint assembly, although FIG. 8 shows only the joint after assembly has been effected.

Assembly of the joint or fitting may be accomplished by first inserting sleeve 408 carrying gasket 400 into female member aperture 404 to the point where gasket 400 deforms under the pressure exerted by female member tapered surface 406, thereby concentrating sealing forces at the zone adjacent gasket 400, and effecting an hermetic seal around the zone. Although the candiate materials mentioned above for sleeve 408 are generally brittle in nature, the sleeve will not fracture as the resultant forces on the sleeve after insertion are compressive, and the materials can withstand substantial compressive forces.

The conductor post 418 carrying gasket 401 is subsequently inserted through the interior of sleeve 408 and is driven into engagement with the inner tapered surface 412. Again, gasket 401 is compressed, the sealing forces being concentrated at the circumferential zone defined by gasket 401, and an hermetic seal is effected between conductor post 418 and sleeve 408. Conductor post 418 thus need not be sealed at narrow end aperture 416, as the airtight seal against potential leak paths in the fitting is provided at the zones where the gaskets 400, 401 are disposed.

Figure 8B:
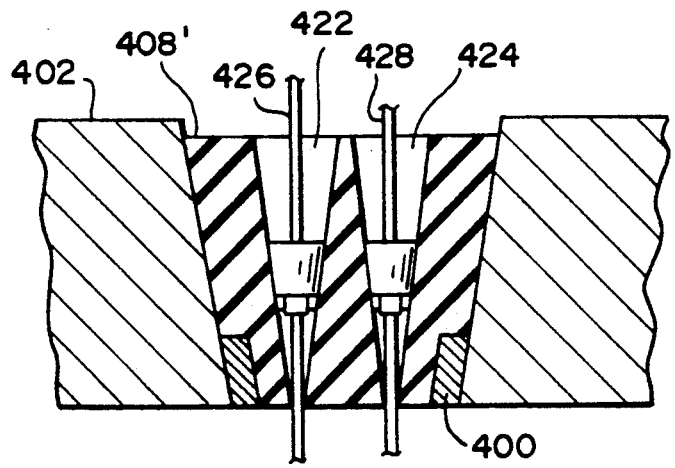

FIG. 8b depicts a variation of the tapered ceramic sleeve 408' which is sealed within female member wall 402 employing sealing gasket 400. Here it can be seen that sleeve 408' may be provided having an outer surface taper 410 adapted to sealingly engage the female wall tapered surface 406, as well as a plurality of tapered bores 422, 424 extending therethrough. The FIG. 8a embodiment depicts only one of these tapered bores, referred to there as a tapered inner surface of the sleeve.

Each of tapered bores 422, 424 is adapted to receive a feedthrough 426, 428, shown in FIB. 8b as conductor pins. These conductor pins may advantageously be sealed hermetically within the bores 422, 424 in a manner identical to that described with respect to conductor post or pin 418 shown in FIG. 8a. It is to be noted that, although conductor pin feedthroughs are depicted in FIGS. 8a, 8b, any of the various fittings discussed herein maybe employed provided that they are appropriately sized to fit tapered bores 412 (FIG. 8a), or 422,424 (FIG. 8b). Ceramic materials are advantageously used in a feedthrough joint of this type, as the compressive forces exerted on sleeve 408' will prevent the otherwise brittle sleeve from fracturing when the one or more fittings are inserted into the tapered internal bores.

Figure 9A:
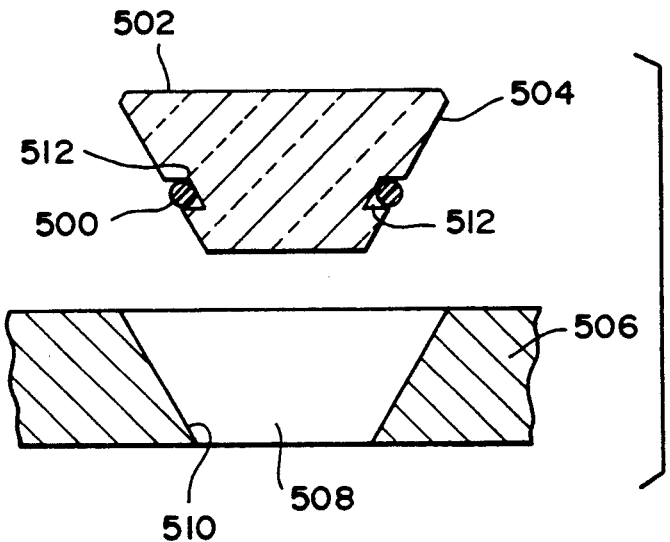
FIGS. 9a,b illustrate a cross-section of yet a further embodiment of a feedthrough joint of the present invention.
Figure 9B:
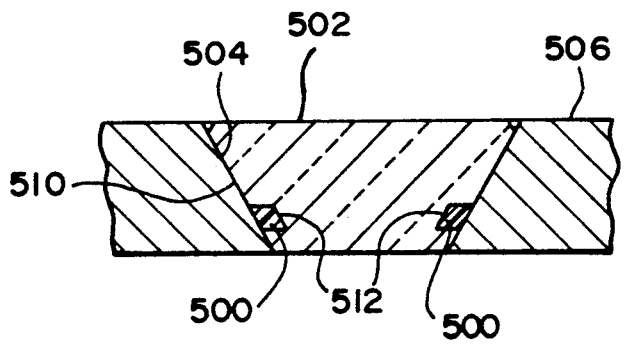

FIGS. 9a,b illustrate a further embodiment of a tapered, ram-type seal wherein sealing forces are concentrated at a predetermined band or zone between male and female members during draw up of the joint. Gasket 500 in this embodiment may comprise an elastomeric O-ring type seal or any other configuration of an elastomeric seal suitable for use. Male member 502, depicted here as an optical glass, is provided with a tapered surface 504. Female member wall 506 is provided with an aperture 508 defined by tapered wall surface 510.

Tapered surface 504 of male member 502 is provided in this embodiment with an annular channel 512 extending around a circumference thereof at a predetermined axial or longitudinal location. Channel 512 is adapted to receive and provide an inner seating for gasket 500, and will retain the gasket in position during draw up of the joint. Channel 512 and gasket 500 are appropriately sized such that gasket 500 protrudes outwardly a small distance from tapered surface 504.

Gasket 500 is seated in channel 512 to produce a subassembly which is subsequently introduced into aperture 508. Upon insertion and application of assembly forces, gasket 500 initially engages female member tapered surface 510 and begins, under compression, to deform to conform to the shape of channel 512. Draw up or sealing forces are thus concentrated at an annular zone at the level of gasket 500. Further insertion brings tapered surface 504 into frictional locking engagement with tapered surface 510, with gasket 500 being further compressed into channel 512 while at the same time maintaining airtight contact with female member tapered surface 510.

While the FIGS. 9a,b embodiment is shown as a fitting for an optical glass, it is not intended that the use of a fitting of this type be so limited. As with the previously disclosed embodiments of the ram-type seal, seal integrity may be ensured by positioning the wide apertures of the elements or components facing a surface of the equipment experiencing the higher pressure.

Although the present invention has been discussed and described with primary emphasis on the preferred embodiments, it should be understood that various modifications can be made in the design and operation of the present invention without departing from the spirit and scope thereof. The above-described embodiments and methods of manufacture are therefore to be considered in all respect as illustrative and not restrictive, the scope of the invention being defined by the appended claims.

What is claimed is:

1. A gasket for use in a tapered joint, the joint comprising a tapered male member, a tapered female member and said gasket, said gasket comprising a separable element from said male and female members, said gasket having a longitudinal extent and having a first and a second aperture end, said first aperture end being larger in cross-section than said second aperture end, said gasket having an inner surface adapted to engage said male member and an outer surface adapted to engage said female member, said gasket further having means for concentrating sealing forces of said joint at a predetermined circumferential portion of said gasket, said portion extending along only a part of said longitudinal extent to produce a substantially leak proof seal at said predetermined portion.

2. A gasket as defined in claim 1 wherein said gasket is made of a malleable metal.

3. A gasket as defined in claim 2, wherein said force concentrating means comprises an integral sealing ring extending outwardly from said outer surface of said gasket as said predetermined portion and around an entire circumference of said gasket at said predetermined portion.

4. A gasket as defined in claim 3 wherein said sealing ring is disposed adjacent to said second aperture end.

5. A gasket as defined in claim 2 wherein said gasket comprises a substantially frusto-conical tube, said inner and outer surfaces of said gasket being threaded, and wherein said male and female members to be joined are threaded.

6. A gasket as defined in claim 5 wherein said force concentrating means comprises an integral annular protrusion extending inwardly from said inner surface at said predetermined portion around an entire circumference of said inner surface at said zone.

7. A gasket as defined in claim 6 wherein said annular protrusion is disposed adjacent to said second aperture end.

8. A gasket as defined in claim 5 wherein said force concentrating means comprises a non-uniform gasket wall thickness wherein said gasket wall thickness increases from said first aperture end toward said second aperture end.

9. A joint for use in providing a substantially hermetic seal comprising:
   a. a tapered, frusto-conical male member;
   b. an apertured female member having a sidewall of substantially frusto-conical shape adapted to frictionally engage said male member; and
   c. means for sealing said joint substantially hermetically, said sealing means comprising an annular channel disposed around a circumference of said male member and a gasket comprising an elastomeric ring disposed in said channel, said ring and said channel being so constructed and arranged that said ring protrudes radially outwardly from said male member frusto-conical surface when said ring is in an uncompressed state, said ring and said channel further being so constructed and arranged to be disposed completely between said male and female members when said joint is assembled.

10. A joint as defined in claim 9 wherein said male member further comprises at least one tapered bore extending through said male member and adapted to sealingly engage a further tapered, frusto-conical male member.

11. A joint as defined in claim 10 wherein said male member further comprises a plurality of tapered bores extending therethrough.

12. A joint as defined in claim 10 further comprising a second male member having a frusto-conical surface adapted to hermetically engage said at least one tapered bore.

13. A joint as defined in claim 12 wherein said male member further comprises a plurality of tapered bores extending therethrough.

14. A threaded metal gasket for use in a threaded joint said gasket comprising an element separate from a male and a female member of said threaded joint, said gasket comprising a substantially cylindrical tube having a first and a second aperture end, said gasket having threads on an inner and on an outer surface, said outer surface being engagable with a threaded female member, said inner surface being engagable with a threaded male member to form the threaded joint, said gasket having means for concentrating sealing forces on said gasket at a predetermined circumferential portion of said gasket, said circumferential portion extending along only a part of a longitudinal extent of said gasket to produce a substantially leak proof seal at said circumferential portion in said joint.

15. A threaded metal gasket as defined in claim 14 wherein said inner and outer surfaces define a gasket wall thickness of non-uniform dimensions which increases from an outer aperture end of said gasket toward an inner aperture end of said gasket such that said gasket wall thickness at said inner aperture end is substantially larger than said gasket wall thickness at said outer end.

16. The threaded metal gasket as defined in claim 15, wherein said gasket inner and outer surfaces are both tapered with respect to a longitudinal axis of said tube and wherein said aperture end having said substantially larger gasket wall thickness has a smaller aperture diameter than said other aperture end.

17. The threaded metal gasket as defined in claim 16, wherein said outer surface taper is of between 0° and 3° with respect to said longitudinal axis and said inner surface taper is greater than said gasket outer surface taper angle and less than or equal to about 10° with respect to said axis.

18. The threaded metal gasket as defined in claim 17, wherein said outer surface taper is angled at approximately 1.78° with respect to said longitudinal axis and said inner surface taper is angled at approximately 6° with respect to said axis.

19. The threaded metal gasket as defined in claim 18, wherein said gasket comprises copper.

20. The threaded metal gasket as defined in claim 16, wherein said gasket comprises a soft malleable metal.

21. The threaded metal gasket as defined in claim 20, wherein said gasket comprises copper.

22. A joint for use in providing a substantially hermetic seal comprising:
   a. a tapered, frusto-conical male member;
   b. an apertured female member having a sidewall of substantially frusto-conical shape adapted to frictionally-engage said male member; and
   c. means for sealing said joint comprising a gasket intercalated between said frusto-conical male member and said female member, said gasket having at least one circumferential section extending along only a part of a longitudinal extent of said gasket, wherein a portion of said gasket protrudes radially outwardly for engaging said sidewall of said female member with respect to a remainder of said gasket and a longitudinal axis of said male member, whereby a hermetic seal is effected around said circumferential section between said male and female members when in an engaged position, and wherein said male and female members are so constructed and arranged to have self-locking tapers to form a self-locking tapered joint.

23. A joint as defined in claim 22, wherein said male member further comprises a frusto-conical surface with a wide end and a narrow end and having a step at said narrow end forming an annular depression in said frusto-conical surface for receiving said gasket, and said gasket further comprises a fillet circumferentially abutting said male member at said narrow end, said gasket being adapted to complement said male member frusto-conical surface, and said gasket further comprises a band forming a raised annular projection protruding from said complementary frusto-conical surface for engagement with said female frusto-conical surface, said band producing an hermetic seal when said male and female members are in an engaged position.

24. A joint as defined in claim 23, wherein said fillet comprises a soft malleable metal.

25. A joint as defined in claim 24, wherein said fillet comprises copper.

26. A joint as defined in claim 23 where said male member further comprises at least one tapered inner surface, and said male member comprises a sleeve.

27. A joint as defined in claim 26 further comprising a second male member having a frusto-conical surface with a wide end and a narrow end adapted to engage said at least one tapered inner surface of said sleeve.

28. A joint as defined in claim 22 wherein said gasket means comprises a gasket having an inner surface adapted to engage said male member and an outer surface adapted to engage said female member, wherein said gasket has a predetermined annular section extending along only a part of a longitudinal extent of said gasket which has a greater wall thickness than the remainder of the gasket, the wall thickness of the gasket in all locations other than in said section being substantially uniform.

29. A joint as defined in claim 28 wherein said outer surface of said gasket has an annular protrusion around a circumference of said outer surface at said predetermined section.

30. A joint as defined in claim 29 wherein said gasket comprises a malleable metal.

31. A joint as defined in claim 22 wherein said male member further comprises at least one tapered bore extending therethrough and adapted to sealingly engage at least one further tapered, frusto-conical male member.

32. A joint as defined in claim 31 further comprising a second male member having a frusto-conical surface adapted to hermetically engage said at least one tapered bore.

33. A joint as defined in claim 22 wherein said gasket further comprises an undercut region adapted to accommodate a flash of gasket material resulting from a plastic deformation of said radially protruding portion of said gasket when said joint is assembled.

34. A joint for use in providing a substantially hermetic seal comprising:
 a. a tapered, frusto-conical male member;
 b. an apertured female member having a sidewall of substantially frusto-conical shape adapted to frictionally engage said male member; and
 c. means for sealing said joint comprising a gasket intercalated between said frusto-conical male member and said female member, said gasket having at least one circumferential section extending along only a part of a longitudinal extent of said gasket, wherein a portion of said gasket protrudes radially outwardly for engaging said sidewall of said female member with respect to a remainder of said gasket and a longitudinal axis of said male member, whereby an hermetic seal is effected around said circumferential section between said male and female members when in an engaged position, and
 wherein said sealing means comprises a gasket having a gasket outer surface being tapered at an angle between 0° and about 3° with respect to the longitudinal axis and a gasket inner surface being tapered at an angle greater than said taper angle of said gasket outer surface, and less than or equal to about 10° with respect to the longitudinal axis, resulting in a narrow end of the frusto-conical gasket having a wall thickness between said inner and outer surfaces which is larger than a wall thickness at the wide end of said gasket.

35. A joint as defined in claim 34, wherein said gasket outer surface is tapered at an angle of approximately 1.78° with respect to the longitudinal axis and said gasket inner surface is tapered at an angle of approximately 6° with respect to the longitudinal axis.

36. A joint as defined in claim 35, wherein said male member and said female member each have screwthreaded surfaces and said gasket inner and outer surfaces are each screwthreaded for complementary engagement in an engaged position.

37. A joint for use in providing a substantially hermetic seal comprising:
 a. a tapered, frusto-conical male member;
 b. an apertured female member having a sidewall of substantially frusto-conical shape adapted to frictionally engage said male member; and
 c. means for sealing said joint comprising a gasket intercalated between said frusto-conical male member and said female member, said gasket having at least one circumferential section extending along only a part of a longitudinal extent of said gasket wherein a portion of said gasket protrudes radially outwardly for engaging said sidewall of said female member with respect to a remainder of said gasket and a longitudinal axis of said male member, whereby an hermetic seal is effected around said circumferential section between said male and female members when in an engaged position, and
 wherein said male member further comprises a frusto-conical surface with a wide end and a narrow end and having a step at said narrow end forming an annular depression in said frusto-conical surface for receiving said gasket, and said gasket further comprises a fillet circumferentially abutting said male member at said narrow end, said gasket being adapted to complement said male member frusto-conical surface, said gasket further comprising a band forming a raised annular projection protruding from said complementary frusto-conical surface for engagement with said female frusto-conical surface, said band producing a hermetic seal when said male and female members are in an engaged position, and
 wherein said male member narrow end step further includes a chamfer and said fillet adjacent said step includes a chamfer resulting in a circumferential concavity for receiving flash from said gasket when said male member and said female member are brought into an engaged position.

38. A joint for use in providing a substantially hermetic seal comprising:
 a. a tapered, frusto-conical male member;
 b. an apertured female member having a sidewall of substantially frusto-conical shape adapted to frictionally engage said male member; and
 c. means for sealing said joint comprising a gasket intercalated between said frusto-conical male member and said female member, said gasket having at least one circumferential section extending along only a part of a longitudinal extent of said gasket wherein a portion of said gasket protrudes radially outwardly for engaging said sidewall of said female member with respect to a remainder of said gasket and a longitudinal axis of said male member, whereby a hermetic seal is effected around said circumferential section between said male and female members when in an engaged position, and
 wherein said gasket means comprises a gasket having an inner surface adapted to engage said male member and an outer surface adapted to engage said female member, wherein said gasket has a predetermined annular section extending along only a part of a longitudinal extent of said gasket which has a greater wall thickness than the remainder of the gasket, the wall thickness of the gasket in all locations other than in said annular section being substantially uniform; and
 wherein said outer surface of said gasket has an annular protrusion around a circumference of said outer surface at said predetermined section; and wherein said gasket has a smaller aperture and a larger aperture and said predetermined annular section is disposed closer to said smaller aperture than to said larger aperture.

39. A joint for use in providing a substantially hermetic seal comprising:
- a. a tapered, frusto-conical male member;
- b. an apertured female member having a sidewall of substantially frusto-conical shape adapted to frictionally engage said male member; and
- c. means for sealing said joint comprising a gasket intercalated between said frusto-conical male member and said female member, said gasket having at least one circumferential section extending along only a part of a longitudinal extent of said gasket wherein a portion of said gasket protrudes radially outwardly for engaging said sidewall of said female member with respect to a remainder of said gasket and a longitudinal axis of said male member, whereby an hermetic seal is effected around said circumferential section between said male and female members when in an engaged position, and wherein said male member further comprises a frusto-conical surface with a wide end and a narrow end and having a step at said narrow end forming an annular depression in said frusto-conical surface for receiving said gasket, said gasket further comprises a fillet circumferentially abutting said male member at said narrow end, said gasket being adapted to complement said male member frusto-conical surface, and said gasket further comprising a band forming a raised annular projection protruding from said complementary frusto-conical surface for engagement with said female frusto-conical surface, said band producing an hermetic seal when said male and female members are in an engaged position, and wherein said male member further comprises at least one tapered inner surface, and said male member comprises a sleeve, the joint further comprising a second male member having a frusto-conical surface with a wide end and a narrow end, adapted to engage said at least one tapered inner surface of said sleeve, and wherein said second male member has a step at said narrow end and said joint further comprises a second gasket adapted to circumferentially abut said second male member at said step at said narrow end and being adapted to complement said frusto-conical surface, and wherein said gasket means further comprises a fillet having a band forming a raised annular projection protruding from said complementary frusto-conical surface for engagement with said tapered inner surface of said sleeve, said band producing an hermetic seal when said second male member and said sleeve are in an engaged position.

40. A joint as defined in claim 39 wherein said sleeve comprising said male member is made of an electrically insulative material.

41. A joint as defined in claim 40 wherein said material is a ceramic material.

* * * * *

UNITED STATES PATENT AND TRADEMARK OFFICE
CERTIFICATE OF CORRECTION

PATENT NO. : 5,188,402

DATED : February 23, 1993

INVENTOR(S) : Samuel O. COLGATE, ET AL

It is certified that error appears in the above-identified patent and that said Letters Patent is hereby corrected as shown below:

Column 14, line 48 [Claim 3, line 4]: delete "as" and insert -- at --

Column 16, line 19 [Claim 22, line 6]: delete the hyphen (-) before "engage"

Signed and Sealed this

Thirtieth Day of November, 1993

Attest:

BRUCE LEHMAN

Attesting Officer

Commissioner of Patents and Trademarks